C. HUMBERT & J. C. BEUGNOT.
VEHICLE WHEEL.
APPLICATION FILED NOV. 7, 1907.

973,436.

Patented Oct. 18, 1910.

2 SHEETS—SHEET 1.

Witnesses
William Miller
Christian Almstaedt

Inventors
Charles Humbert
Jules C. Beugnot
By W. C. Hauff
Attorney

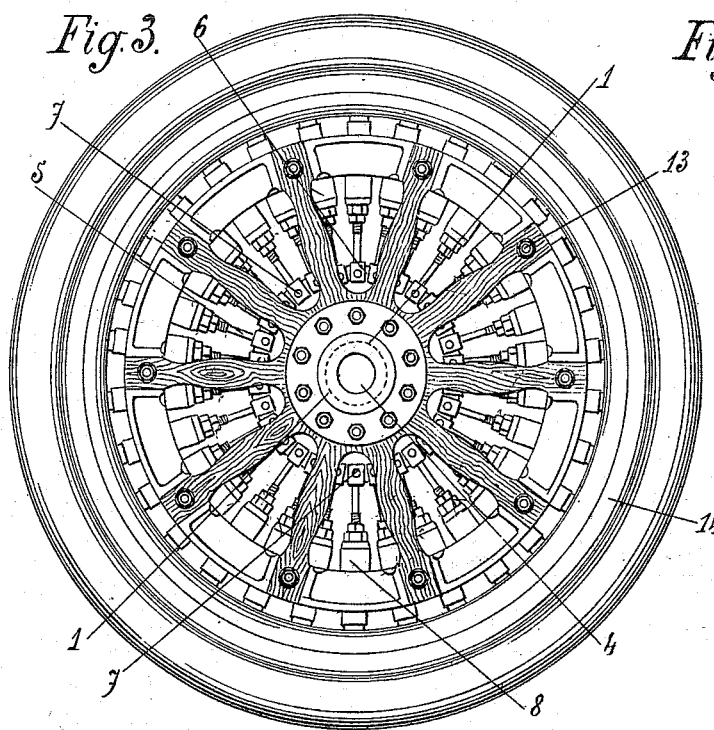
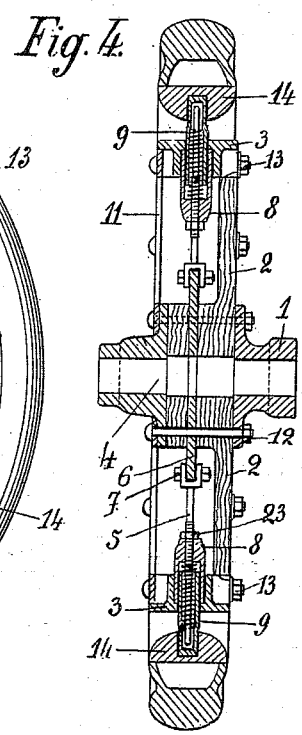

UNITED STATES PATENT OFFICE.

CHARLES HUMBERT AND JULES CLAUDE BEUGNOT, OF PARIS, FRANCE.

VEHICLE-WHEEL.

973,436.  Specification of Letters Patent. Patented Oct. 18, 1910.

Application filed November 7, 1907. Serial No. 401,175.

*To all whom it may concern:*

Be it known that we, CHARLES HUMBERT and JULES CLAUDE BEUGNOT, both citizens of the Republic of France, residing at Paris, France, have invented new and useful Improvements in Vehicle-Wheels, of which the following is a specification.

The present invention relates to certain improvements in or connected with a former invention for which a patent has been applied for in the United States under No. 337473, filed October 4th 1906, and the object thereof is to dispense with the flat springs situated on the inside of the rim of the wheel without decreasing the resiliency thereof.

Figure 1:
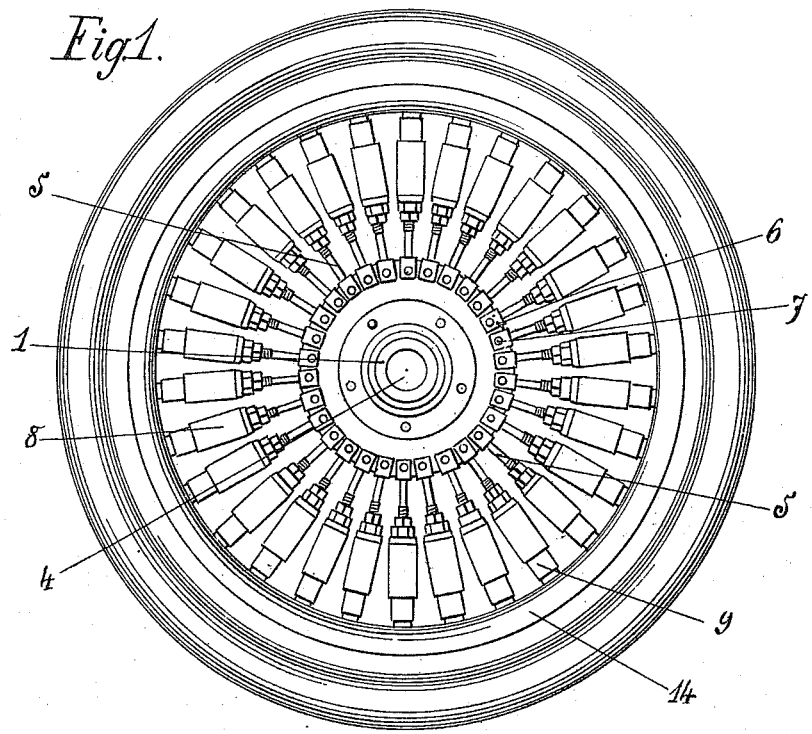
Figure 2:
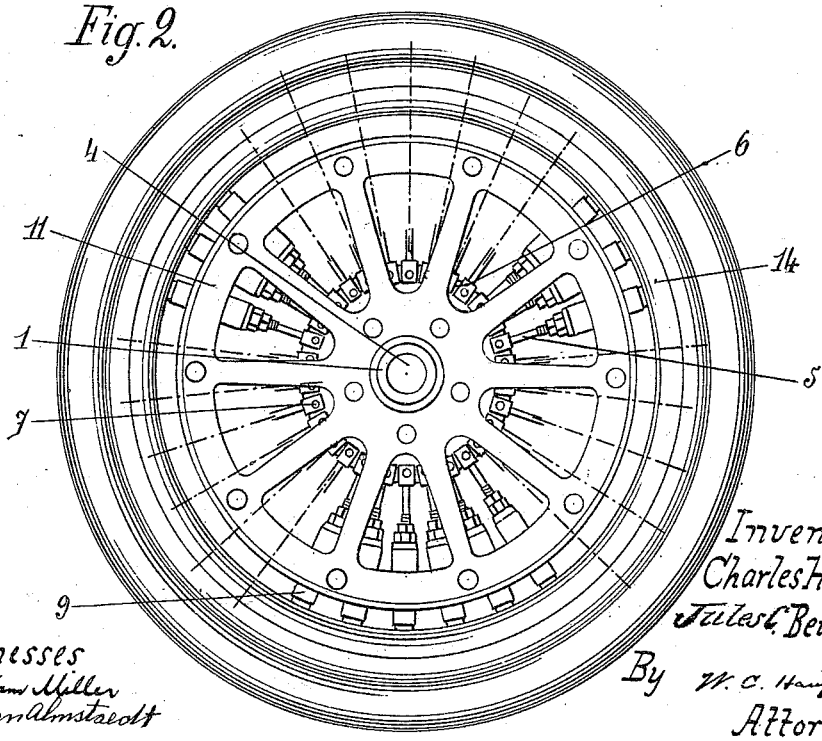

Our invention is illustrated by the accompanying drawings in which:

Figure 1 represents front view of a wheel constructed according to this invention with the spider removed. Fig. 2 represents front view of same wheel with spider in position, a portion only of the spring spokes being shown. Fig. 3 shows back view of same wheel. Fig. 3ª is an inverted plan view of a floating rim. Fig. 4 is vertical section of same. Fig. 5 is back view of spider; Fig. 6 shows a modified form of the invention in which the outer rim of the wheel is made in two portions, the outer portion sliding within the inner portion, the said portions forming a shield to protect the springs from mud and dust.

The same letters denote the same parts in all the figures.

Now according to this invention, we provide a triple set of spokes two sets of which are rigid and are attached at one end to the hub of the wheel and at the other end to a rim while the third set of spokes is elastic and is connected at one end to the hub of the wheel or to a rim forming part of or secured to the hub, the other end of such elastic spokes being retained in position relatively to a rim carrying the tire as hereinafter described, it being understood that the wheel virtually consists of two wheels of different diameters concentric with each other the smaller wheel being rigid while the larger wheel is elastic and capable of vertical and horizontal displacement relative to the smaller wheel, while both wheels rotate together on a common axle.

1 is the hub of the wheel between the flanges of which are secured the rigid spokes 2 the other end of said spokes being secured in pockets in the rim 3 by means of bolts 13. We provide also a second set of spokes 11 which is also secured to the rim 3 and to the hub 1 by any suitable means.

As shown by the drawings the spokes 11 take the form of a metal spider which is secured to the hub 1 and to the rim 3 by means of bolts 12 and 13.

The hub 1 is bored at 4 to receive the axle and in the said hub is secured a flange 6 to which are secured the inner ends of the supplementary elastic spokes 5 by means of the bolts 7. The outer ends of the supplementary spokes 5 pass through the portions 8 and enter the portions 9 of the telescoping sheaths which portions are inserted in recesses in the rim 3. The portion 9 of the sheaths is inserted, not fixed, in oblong holes or sockets in the floating rim 14 (Fig. 4).

The portions 8 and 9 of the sheaths are so proportioned that when the spiral springs are compressed to the full extent the two portions of the sheaths do not come in contact radially so that the rim 14 to which the tire is attached, always floats around the rim 3, that is to say the portion 8 of the sheaths is bored deeper than the radial movement of the portion 9.

The springs in the sheaths are compressed to the necessary degree when building the wheel by means of nuts 23 screwed on to the spokes 5. If necessary the spokes 5 may be screwed into the portion 8 of the sheaths. By removing the bolt 7 a spoke sheath and spring are easily detached from the flange 6 and rim 3 without disturbing any other part of the wheel.

In order to protect the elastic spokes from dust and mud which might impede the perfect working of the springs and sheaths, we may incase them in a shield formed of two flat rings 17 secured to the rim 3 and a channel ring 16, or the ring 16 may be made up of two angle irons as shown by Fig. 6 for convenience in bending.

The tire ring 18 is secured to the channel or angle irons by rivets 19. In Fig. 6, 14 is the rim inside the channel or angle irons in the holes of which are directly inserted the outer ends of the portions 9 of the sheaths; these oblong shaped holes Fig. 3ª allow the longitudinal and free displacement of the elastic spokes. The rim 3 is recessed on each side at 16′ to allow the free movement of the channel rim 16. A steel ring 15 is fitted inside the said angle iron so as to strengthen the said angle iron. The outer ends of the portions 9 of the sheaths bear against this ring 15.

20 are metal cross tubes fitted between each of the spokes; these tubes which prevent lateral deflection of the angle irons are secured in their proper position by rivets 21, the heads of the rivets being countersunk and dressed off flush with the outside of the angle irons.

To assemble the wheel, the spokes 2 are first bolted to the rim 3 the sheaths and springs are placed in their respective sockets in the rim 3, the spokes 5 are then inserted in the sheaths and the springs compressed one by one until the jaws on the spokes 5 slip over the flange 6, the springs are compressed, finally the spider 11 is placed on the hub and bolted thereto and to the rim 3 by the bolts 12 and 13. Should a spring be broken it may be replaced by taking out the spoke corresponding to the broken spring.

The wheel may be fitted with solid tires if desired.

Claim:

A wheel for vehicles comprising a hub, a rigid rim, spokes rigidly secured at one side to the hub and rigid rim, a spider rigidly secured to the other side of the hub and rigid rim, sheaths comprising male and female members slidable in the rim, a flange in the hub, spokes secured at one end to the flange and at the other end engaging the female portion of the sheaths, a spring in the sheath and a floating rim, two rings secured to the rim, said floating rim comprising rings formed of angle irons sliding in said rings on the rim and a ring inside the angle irons adapted to bear on the sheaths in the rim.

In testimony whereof we have hereunto set our hands in the presence of two subscribing witnesses.

CH. HUMBERT.
JULES CLAUDE BEUGNOT.

Witnesses:
H. C. COXE,
EDOUARD NOY.